Patented July 10, 1928.

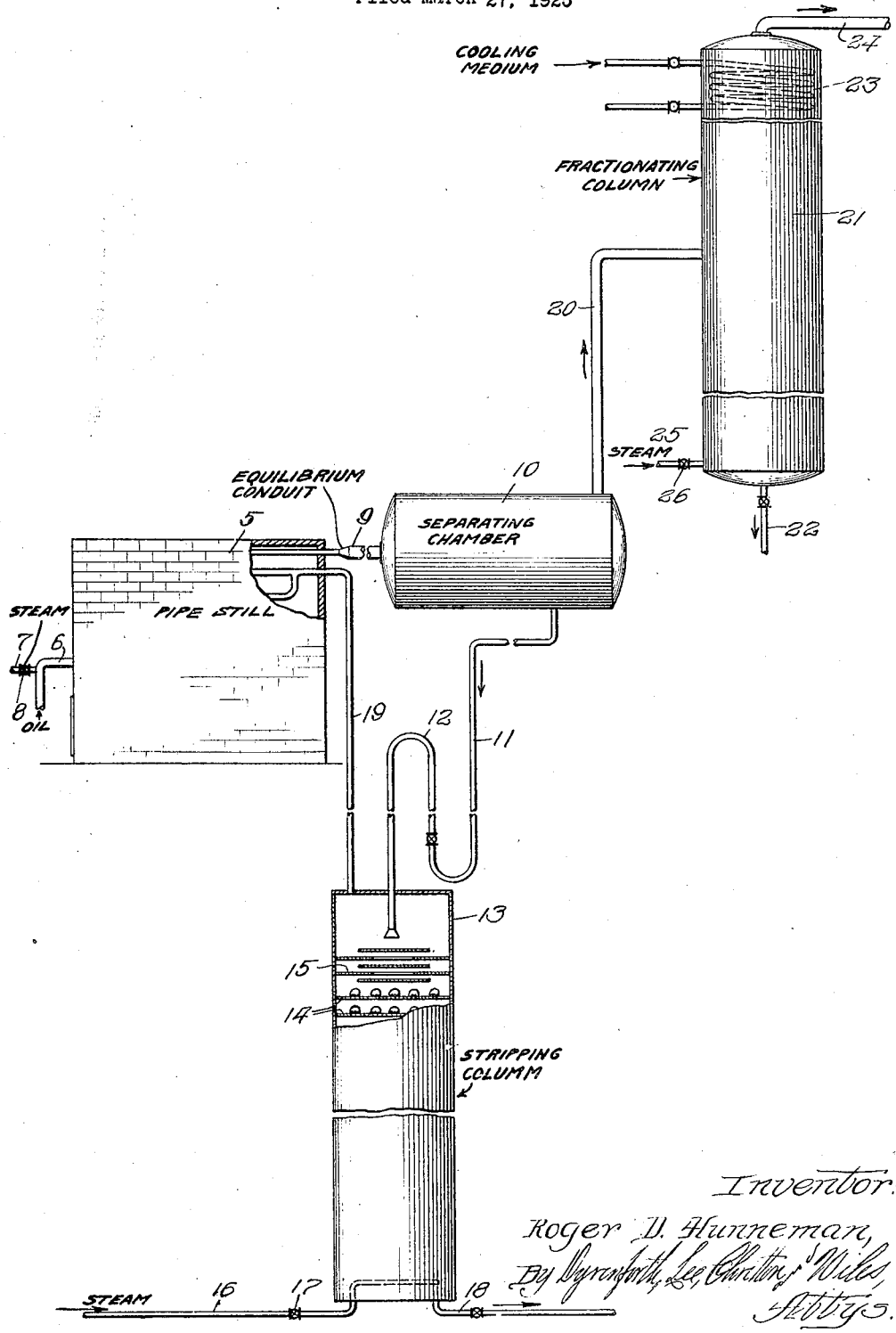

1,676,611

UNITED STATES PATENT OFFICE.

ROGER D. HUNNEMAN, OF CHICAGO, ILLINOIS, ASSIGNOR TO STANDARD OIL COMPANY, OF WHITING, INDIANA, A CORPORATION OF INDIANA.

ART OF CONTINUOUS DISTILLATION OF HYDROCARBON OILS.

Application filed March 27, 1925. Serial No. 18,818.

The present invention relates to improvements in the distillation of hydrocarbon oils, and more particularly of lubricating oils or distillates, for the production of maximum quantities of viscous lubricant residues and distillate products. It will be fully understood from the following description, illustrated by the accompanying drawing, in which is shown diagrammatically a layout of apparatus suitable for carrying the invention into effect.

Referring more particularly to the drawing, the numeral 5 indicates a pipe still, in which the oil to be distilled is fed through the line 6. If desired, steam may be supplied through the pipe 7 controlled by a valve 8, or into the pipe still at any suitable intermediate point. From the pipe still 5 the oil, heated to the desired temperature, passes through the enlarged equilibrium conduit 9 to a chamber 10, of substantial cross sectional area so that the velocity of the vapors passing therethrough is materially lowered, and separation of vapors and unvaporized liquid may take place.

From the separating chamber 10, unvaporized liquids pass out through the pipe or line 11. This line 11 is preferably provided with a trap 12, and discharges into the upper portion of a column 13, which is supplied with fractionating plates of any suitable type; for example, bubble plates 14 and disk and doughnut plates 15. Steam is supplied to the bottom of the stripping column 13 through the line 16, and passes through the column in countercurrent to the descending liquid, further vaporizing and removing the lighter ends thereof. The proportion of the steam may readily be controlled by means of valve 17 to secure the desired characteristics (for example, flash point or gravity) of the residual product. Unvaporized residue is drawn off through the valved line 18.

The steam and vapors removed thereby pass out of the top of the column 13 through the line 19, and may suitably be introduced into the oil passing through the pipe still 5 at an intermediate point of the coil, as shown in the drawing.

From the separating chamber 10, vapors pass through the line 20 to a fractionating column 21, provided with fractionating plates of any desired type; preferably low pressure drop plates at least above the point of admission of vapors. In the fractionating tower 21 fractional condensation takes place, the condensate formed descending to the base of the column and being withdrawn through the valved discharge pipe 22. If desired, the condensing action of the column may be controlled by the application of a suitable cooling medium in the upper portion of the tower; for example, water, raw oil, or other suitable cooling medium may be passed through the cooling coils 23 suitably located therein. The uncondensed oil and steam pass out of the dephlegmating tower 21 through the vapor line 24. Provision is made for the supply of steam to the lower portion of the column 21 through the line 25 controlled by valve 26, so that steam may be employed, if desired, to ensure the removal of lighter fractions from the intermediate products drawn off through the line 22.

The vapor line 24 leads to any suitable condensing device, and, if operation under vacuum is desired, any suitable means may be employed for securing the desired vacuum. In the production of lubricating oils, it is desirable that a high vacuum be maintained; for example, an absolute pressure of 100 millimeters or less may be maintained upon the system.

The process is particularly adapted for the production of viscous residues and distillates, particularly lubricating oils, from crude and reduced crude oils or from distillates. Thus the feed stock may suitably be a heavy asphaltic oil having a gravity of 21° A. P. I., a viscosity of 900 seconds Saybolt at 100° F. and a flash point of about 150 to 175° F. It is brought in the pipe still 5 to a temperature and pressure conditions prevailing being varied in accordance with the nature of the product desired. From 1 to 6 pounds of steam per gallon of oil distillate may be supplied in the coil still 5 and the tower 13, from one-tenth to one-half of this being supplied in the tower 13 and the remainder through the steam line 7 directly into the pipe still, with a temperature in the flash drum of 660° F., and employing about 4 pounds of steam per gallon of total oil distillate, of which about one-fourth is supplied in the tower 13, a heavy distillate may be readily obtained in the tower 21 under subatmospheric pressure conditions (about 53 mm. of Hg) having a viscosity of about 750 seconds Saybolt at 100° F. and a flash point of about 390° F. The light distillate obtained from the vapors leaving tower 21 has a gravity of 25 to 26 A. P. I., a viscosity of 43 at 100° F. an initial boiling point of 400 to 420° F. and an end point of 620 to 660° F. The residue obtained in tower 13 has a gravity of 1.004 at 77° F., a melting point of 122° F., a flash of 525° F., and contains 95% of constituents soluble in $CS_2$, $CCl_4$ and hexane.

The vapors and steam separated from the unvaporized oil leave the chamber 10 and enter the tower 21 at an intermediate point. A partial condensation takes place therein, the heavier portion of the oil being condensed and forming an intermeditae viscous fraction which is removed through the draw-off line 22. The characteristics of the intermediate distillate thus formed may be readily controlled by the injection of a small amount of steam through the line 25, the supply of steam being controlled in accordance with the desired inspection tests of the heavy distillate. These are, in general, flash point and viscosity. The lighter, uncondensed portions of the oil, together with the steam pass out through the vapor line 24 to suitable condensing apparatus (not shown). When conditions require a more careful control of the character of the light condensate produced from the vapors issuing through the line 24, a cooling coil 23 may be employed in the top of the tower, water or oil being circulated thereto to control the temperature of the issuing vapors.

It is to be understood that where proportions of steam relative to oil distillate are hereinbefore referred to, the oil distillate is the sum total of the condensates formed in the tower 21 and from the condensation of the vapors passing out of the tower through the line 24.

I claim:

1. The method of distilling hydrocarbon oils which comprises passing the oil in a confined stream through a heating zone, discharging the oil into a separating chamber, supplying steam in said chamber at substantially the same temperature as the oil and in thermal equilibrium therewith, separately removing unvaporized oil and vapors from said chamber, subjecting the removed unvaporized oil to the action of live steam, thereby removing lighter fractions therefrom, withdrawing from the system the thus treated unvaporized oil, commingling the removed lighter fractions with the vapor contents of the separating chamber, subjecting the vapors removed from the separating chamber to a refluxing action and separately collecting the reflux formed.

2. The method of distilling hydrocarbon oils which comprises passing the oil in a confined stream through a heating zone, discharging the oil into a separating chamber, supplying steam in said chamber at substantially the same temperature as the oil and in thermal equilibrium therewith, separately removing unvaporized oil and vapors from said chamber, subjecting the removed unvaporized oil to the action of live steam, thereby removing lighter fractions therefrom, withdrawing from the system the thus treated unvaporized oil, commingling the removed lighter fractions with the vapor contents of the separating chamber, subjecting the vapors removed from the separating chamber to a refluxing action, separately collecting the reflux formed and passing steam through the collected reflux.

3. In distillation apparatus, a heated conduit, a separator into which said conduit discharges, said separator effecting separation of vapors and unvaporized oils, a scrubbing tower, means for introducing unvaporized oil from the separator into the scrubbing tower, means for introducing steam into the lower portion of said scrubbing tower, means for securing the return of vapors from said scrubbing tower to the separator, a vapor conduit leading from the separator, and a fractionating tower into which said vapor conduit opens at an intermediate point, and means for separately withdrawing reflux from said tower.

4. In distillation apparatus, a heated conduit, a separator into which said conduit discharges, said separator effecting separation of vapors and unvaporized oils, a scrubbing tower, means for supplying unvaporized oil from said separator to the scrubbing tower, means for introducing steam into the lower portion of said scrubbing tower, means for leading vapors from said scrubbing tower into the heating conduit, a vapor conduit leading from the separator, a fractionating tower into which the vapor conduit opens at an intermediate point, means for introducing steam into the reflux tower below the opening of the vapor conduit thereinto, and means for separately withdrawing reflux from said tower.

5. In distillation apparatus, a heated conduit, a separator into which said conduit discharges, said separator effecting separation of vapors and unvaporized oils, a scrubbing tower, means for supplying unvaporized oil from said separator to the scrubbing tower, means for introducing steam into the lower portion of said scrubbing tower, means for leading vapors from said scrubbing tower into the heating conduit, a vapor conduit leading from the separator, a fractionating tower into which the vapor conduit opens at an intermediate point, and means for separately withdrawing reflux from said tower.

ROGER D. HUNNEMAN.